United States Patent
Coq et al.

(10) Patent No.: US 11,121,413 B2
(45) Date of Patent: *Sep. 14, 2021

(54) ADVANCE INDICATION OF SHORT-CIRCUIT CONDITIONS IN A WETCELL BATTERY

(71) Applicant: International Business Machines Corporation, Armonk, NY (US)

(72) Inventors: Marc H. Coq, Hopewell Junction, NY (US); Richard J. Fishbune, Rochester, MN (US); Mark E. Maresh, Wake Forest, NC (US); Eric B. Swenson, Pine Island, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 426 days.

This patent is subject to a terminal disclaimer.

(21) Appl. No.: 16/169,787

(22) Filed: Oct. 24, 2018

(65) Prior Publication Data

US 2019/0058226 A1 Feb. 21, 2019

Related U.S. Application Data

(63) Continuation of application No. 15/426,485, filed on Feb. 7, 2017, now Pat. No. 10,147,982.

(51) Int. Cl.
*H01M 10/48* (2006.01)
*H01M 10/14* (2006.01)
(Continued)

(52) U.S. Cl.
CPC ........... *H01M 10/48* (2013.01); *H01M 10/14* (2013.01); *H01M 10/4235* (2013.01);
(Continued)

(58) Field of Classification Search
None
See application file for complete search history.

(56) References Cited

U.S. PATENT DOCUMENTS

| | | | | | |
|---|---|---|---|---|---|
| 2,183,492 | A | * | 12/1939 | Rabl | H01M 10/4285 324/722 |
| 5,250,903 | A | * | 10/1993 | Limuti | H01M 10/484 324/427 |
| 6,829,933 | B1 | * | 12/2004 | Schmidt | H01M 10/484 73/438 |

OTHER PUBLICATIONS

List of all IBM Related Applications, Appendix P 2018.

* cited by examiner

*Primary Examiner* — Alix E Eggerding
(74) *Attorney, Agent, or Firm* — Garg Law Firm, PLLC; Rakesh Garg; Tihon Poltavets

(57) ABSTRACT

A wet-cell in a battery is configured with a set of i-electrodes. A collection surface inside the wet-cell is identified where electrically conductive debris accumulates to an expected height. A first i-electrode of a first polarity in the set of i-electrodes is configured to be located at substantially the expected height inside the wet-cell. A second i-electrode of a second polarity in the set of i-electrodes is configured to be located at substantially the expected height inside the wet-cell. A first indication device is installed where the first i-electrode and the second i-electrode are configured in an electrical circuit via the first indication device, wherein when the electrically conductive debris has accumulated up to the expected height, makes simultaneous electrical contact with the first i-electrode and the second i-electrode and activates the first indication device.

20 Claims, 6 Drawing Sheets

(51) Int. Cl.
*H01M 10/42* (2006.01)
*H01M 50/572* (2021.01)

(52) U.S. Cl.
CPC ....... *H01M 10/488* (2013.01); *H01M 50/572* (2021.01); *H01M 2010/4278* (2013.01)

ADVANCE INDICATION OF SHORT-CIRCUIT CONDITIONS IN A WETCELL BATTERY

TECHNICAL FIELD

The present invention relates generally to a method, system, and computer program product for warning about impending short circuits inside batteries. More particularly, the present invention relates to a method, system, and computer program product for advance indication of short-circuit conditions in a wet-cell battery.

BACKGROUND

Batteries, such as automotive or marine batteries, include one or more cells connected to one another. The cells are electrically connected in a serial connection to increase the voltage output of the battery. The cells are electrically connected in parallel to increase a current output of the battery. A battery can employ series connection, parallel connection, or both between various cells.

A wet-cell battery is a battery in which a cell uses a liquid electrolyte. Electrically conductive electrodes are at least partially submerged into the electrolyte, and the ion exchange occurs between the electrodes through the electrolyte.

A cell has at least two electrodes—one of the positive polarity and one of the negative polarity. In some cells, an electrode takes the form of a plate that is suspended into the electrolyte. Other shapes of the electrodes are also possible and used. In some cells, several electrodes are electrically coupled with one another to electrically function as a single electrode of a designated polarity.

SUMMARY

The illustrative embodiments provide a method, system, and computer program product. An embodiment includes a method that constructs a wet-cell in a battery, the wet-cell comprising and a set of i-electrodes. The embodiment identifies a collection surface inside the wet-cell, wherein electrically conductive debris accumulates on the surface to an expected height. The embodiment configures, by causing a processor and a memory to manipulate a fabrication machine, a first i-electrode of a first polarity in the set of i-electrodes located at substantially the expected height inside the wet-cell. The embodiment configures a second i-electrode of a second polarity in the set of i-electrodes located at substantially the expected height inside the wet-cell. The embodiment installs a first indication device, wherein the first i-electrode and the second i-electrode are configured in an electrical circuit via the first indication device, wherein when the electrically conductive debris has accumulated up to the expected height, makes simultaneous electrical contact with the first i-electrode and the second i-electrode and activates the first indication device.

An embodiment includes a computer usable program product. The computer usable program product includes one or more computer-readable storage devices, and program instructions stored on at least one of the one or more storage devices.

An embodiment includes a wet-cell battery apparatus. The wet-cell battery is fabricated using the method described herein.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
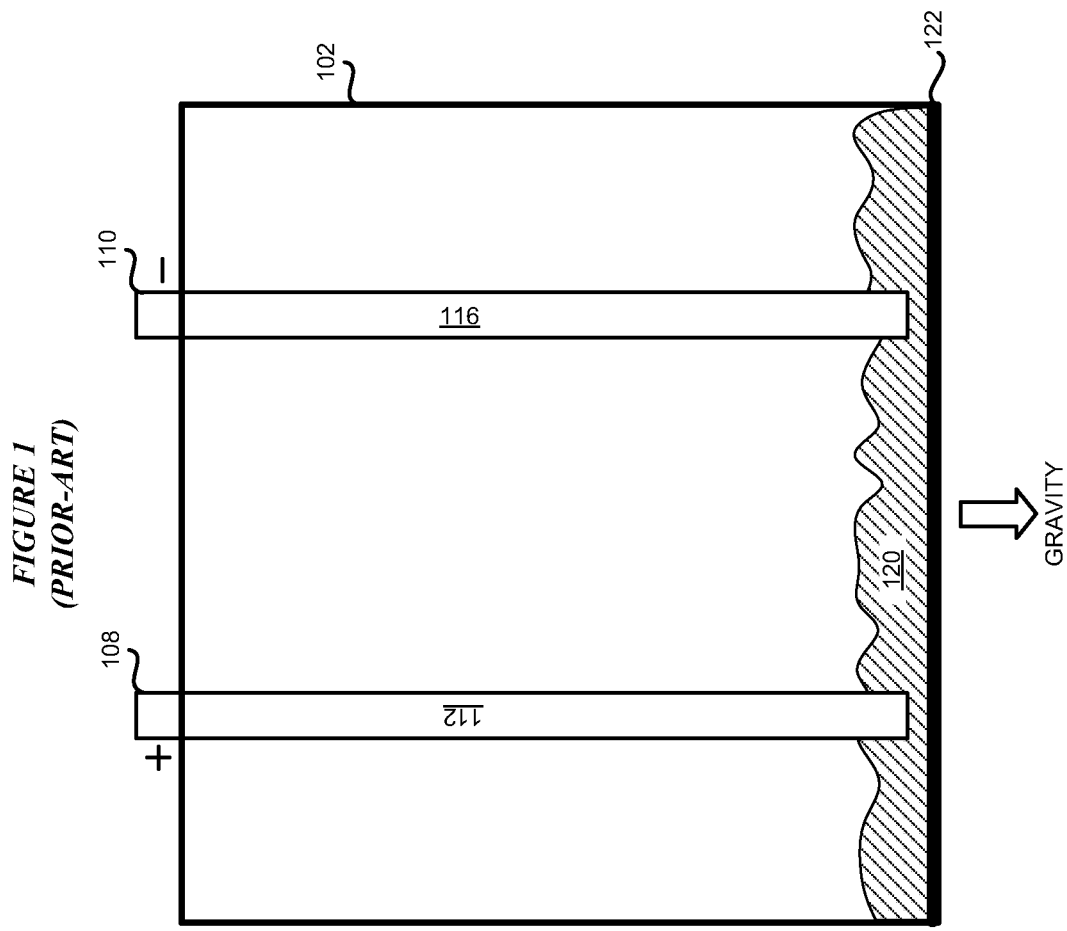
FIG. 1 depicts a prior-art configuration of a wet-cell battery which can be modified according to an illustrative embodiment to provide advance warning of an impending short circuit.

Consider an example of a lead-acid battery, which is a non-limiting example of wet-cell batteries. In a lead-acid battery, an alloy or compound of Lead (Pb) coats or forms some or all of the electrodes (hereinafter referred to as "lead electrode"). The lead electrode is suspended, at least partially, in an acidic electrolyte. One lead electrode is coupled to a battery terminal of the positive polarity, and another lead electrode is coupled to another battery terminal of the negative polarity.

During the operation of the lead-acid battery, particles of the lead alloy flake off from the electrodes. The debris of these particles floats through the electrolyte and deposits on a surface of the inside of the battery due to the action of gravity on these particles.

Typically, in an upright installation of the battery, where the battery terminals generally protrude out and up from the battery, the debris settles and collects on the bottom surface of the battery. In a side-ways installation of the battery, where the battery is installed on one side, the debris collects on a side wall of the battery.

The particles collecting in this debris inside the battery are electrically conductive. The illustrative embodiments recognize that the build-up of conductive debris inside the wet-cell battery can and does cause electrical short-circuits between electrodes of opposite polarities. Generally, the short-circuit occurs when the debris builds up to a level where the debris makes electrically conductive contact with the submerged electrodes of opposite polarities, allowing an electrical current to be able to flow directly from an electrode of one polarity through the debris and to an electrode of another polarity without requiring the ion transfer function of the electrolyte.

The short-circuit within a cell in this manner causes the voltage output of the cell to drop. Often, the short-circuited cell becomes non-contributing to the total voltage output of the battery. For example, a six-cell battery has six cells connected in series, each cell producing 2 volts (V), for a total of 12 V output of the battery. A short-circuit in one cell, as described herein, can cause the total voltage of the battery to drop to 10 V. Such a drop in the voltage output often renders a wet-cell battery unsuitable for the intended application.

The illustrative embodiments recognize that the presently available wet-cell batteries do not include any indicators that can provide an advance warning of a level of debris that has collected inside a wet-cell and can cause a short-circuit in the wet-cell in the future. The illustrative embodiments recognize that the presently available tools or solutions do not address these needs or provide adequate solutions for solving this advance warning need. The illustrative embodiments used to describe the invention generally address and solve the above-described problems and other problems related to conductive debris in wet-cell batteries.

A lead-acid battery is used as a non-limiting example of wet-cell batteries for describing and illustrating the structures and operations of the illustrative embodiments. From this disclosure, those of ordinary skill in the art will be able to conceive many other types of electrodes, electrolytes, and generally other types of wet-cell batteries where the problems described herein can occur, and the embodiments can be applied to such other battery configurations within the scope of the illustrative embodiments.

An i-electrode is an electrode that is configured inside a wet-cell to produce an indication of a level of accumulation of conductive debris inside the wet-cell. An embodiment can be implemented in a wet-cell battery as an i-electrode having a described location property, to wit, a location where the i-electrode is situated in side a wet-cell. A fabrication process for producing the i-electrodes at said location can be implemented in a software application. The application implementing an embodiment can be configured as a modification of an existing fabrication system, as a separate application that operates in conjunction with an existing fabrication system, a standalone application, or some combination thereof.

Only for the clarity of the description, and without implying any limitation thereto, the embodiments are described using a wet-cell in an upright position such that the conductive debris collects inside the wet-cell on the bottom surface of the wet-cell. An embodiment described relative to the upright orientation of the wet-cell can be adapted for other orientations of the wet-cell, where the debris might collect on a surface other than the bottom surface. For example, the placement of the i-electrodes can be changed for different orientations such that the i-electrodes perform the same or similar function as described herein with respect to the debris collection on other surfaces in such different orientations.

A surface on which the debris collects is interchangeably referred to herein as a collection surface.

An embodiment identifies a collection surface inside the cell of a wet-cell battery on which the collection of debris is likely. One embodiment positions an i-electrode of the negative polarity on a first surface and an i-electrode of the positive polarity on a second surface such that the first and the second surfaces are both substantially perpendicular to the collection surface, and the first surface is located on an opposite end of the collection surface relative to an end on which the second surface is located. For example, if the collection surface is a rectangular floor of the wet-cell, the first surface is a wall surface on one edge of the rectangle and the second surface is a wall surface on the opposite edge of the rectangle.

Another embodiment positions an i-electrode of the negative polarity on a first surface and an i-electrode of the positive polarity on a second surface such that the first and the second surfaces are both substantially perpendicular to the collection surface, but the first surface is simply different from the second surface and not necessarily located on opposite ends of the collection surface. For example, if the collection surface is a rectangular floor of the wet-cell, the first surface is a wall surface on one edge of the rectangle and the second surface is a wall surface on the adjoining edge of the rectangle. Such an embodiment is particularly useful when a particular orientation of the wet-cell causes the debris to collect in a corner of the wet-cell.

Another embodiment positions an i-electrode of the negative polarity and an i-electrode of the positive polarity on a common surface such that the common surface is substantially perpendicular to the collection surface. For example, if the collection surface is a rectangular floor of the wet-cell, the common surface is a wall surface on one edge of the rectangle with the positive and negative i-electrodes situated at some lateral distance from one another. Such an embodiment is particularly useful when a particular orientation of the wet-cell causes the debris to collect along an edge of the collection surface in the wet-cell.

One negative i-electrode and one positive i-electrode are needed to indicate one level of accumulation of the debris. For example, when the i-electrodes are located on opposite surfaces and the debris is expected to collect to height x on the collection surface, the negative i-electrode and the positive i-electrode should be located at height x on their respective surfaces such that when the debris reaches height x, the debris makes electrical contact with both—the positive and the negative i-electrodes. This arrangement according to one embodiment allows for indication of debris accumulation up to one level.

For indicating that the collected debris has reached several different levels at different times, the number of i-electrodes of at least one polarity should equal the number of levels for which the indication is desired. For example, if it is desired that indications should be provided when the debris reaches heights x, x+a (which is greater than x), and x+b (which is greater than x+a), at least three positive i-electrodes (with one negative i-electrode), or at least three negative i-electrodes (with one positive i-electrode), or at least three i-electrode of one polarity (and some non-zero number of i-electrodes of the other polarity) should be configured.

For example, a non-limiting placement of the i-electrodes could be as follows—a negative i-electrode on a designated negative i-electrode surface and at height x above the collection surface, a first positive i-electrode on a designated positive i-electrode surface and at height x above the collection surface, a second positive i-electrode on the designated positive i-electrode surface and at height x+a above the collection surface, and a third positive i-electrode on the designated positive i-electrode surface and at height x+b above the collection surface.

In this example non-limiting configuration, the indication of the accumulation up to level x results from the debris making electrical contact between the negative i-electrode at height x and the positive i-electrode at height x. The indication of the accumulation up to level x+a results from the debris making electrical contact between the negative i-electrode at height x and the positive i-electrode at height x+a. The indication of the accumulation up to level x+a results from the debris making electrical contact between the negative i-electrode at height x and the positive i-electrode at height x+b.

These examples of numbers and relative locations of the i-electrodes of different polarities are not intended to be limiting. From this disclosure, those of ordinary skill in the art will be able to conceive many other numbers and relative locations and the same are contemplated within the scope of the illustrative embodiments.

The indication of the level or height of debris collection can be produced using any suitable indicating device. Some examples of indicating devices include, but are not limited to, a light producing device such as a light emitting diode (LED), a sound producing device such as a speaker, a tactile feedback producing device such as a vibrating surface, an electrical signal producing device such as a semiconductor transistor or other switching device, a data generating device such as a logic circuit, and the like.

An embodiment electrically couples an indicating device with at least one i-electrode. When the debris closes an electrical circuit using the coupled i-electrode, the indicating device receives electrical power to produce the corresponding indication.

In some embodiments, the terminals of the wet-cell (or battery) are electrically coupled with i-electrodes of the corresponding polarity to provide the electrical power for the indications. Furthermore, the coupling between a terminal and an i-electrode may include a suitable impedance device, such as a resistor, so as not to cause a short-circuit between the terminals when the debris closes an electrical circuit using the coupled i-electrode.

In one embodiment, the coupling between a terminal and an i-electrode may include a suitable disconnecting device, such as a timer switch. The disconnecting device allows for the indication to be produced for a limited duration after which the indication is terminated or stopped, so as not to drain the wet-cell or the battery from continuous power consumption by the indicating device when the debris closes an electrical circuit using the coupled i-electrode.

These examples of devices are not intended to be limiting. From this disclosure, those of ordinary skill in the art will be able to conceive many other devices that can be coupled with an i-electrode, and the same are contemplated within the scope of the illustrative embodiments.

The manner of indicating impending short-circuit in wet-cell battery due to a level of debris accumulation described herein is unavailable in the presently available methods. A method of an embodiment described herein, when implemented to fabricate a wet-cell battery, comprises substantial advancement of the functionality of that battery in providing advance warning impending short circuiting the electrodes of opposite polarities due to a level of accumulated conductive debris.

The illustrative embodiments are described with respect to certain types of cells, batteries, connections, electrodes, electrolytes, alloys or compounds, shapes, sizes, i-electrodes, indicating devices, impedance devices, disconnecting devices, surfaces on which accumulation occurs, surfaces on which i-electrodes can be installed, locations and numbers of i-electrodes, number of levels of accumulation, orientation of the battery installation, voltages and current, metals, materials, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

The illustrative embodiments are described using specific designs, layouts, schematics, and tools only as examples and are not limiting to the illustrative embodiments. The examples in this disclosure are used only for the clarity of the description and are not limiting to the illustrative embodiments. Additional operations, actions, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to FIG. 1, this figure depicts a prior-art configuration of a wet-cell battery which can be modified according to an illustrative embodiment to provide advance warning of an impending short circuit. Battery 102 is shown with only one example cell but can include any number of cells.

Battery 102 has terminals 108 and 110. Terminal 108 is of the positive polarity and terminal 110 is of the negative polarity as shown. A terminal is depicted as coupled with (or a part of) a single electrode only as a non-limiting example for clarity, but can be electrically coupled with any number of electrodes. For example, terminal 108 is coupled with electrode 112 and terminal 110 is coupled with electrode 116. As a non-limiting example, the electrodes used in battery 102 are flat plates of a certain thickness and are depicted in FIG. 1 in an edge-view.

Debris 120 comprises accumulated conductive particles, as described herein. Assuming that battery 102 is installed and used in the depicted orientation, gravity acts in the direction shown. Accordingly, debris 120 collects on the inside surface of bottom 122 inside battery 102. Only for the clarity of the depiction, and not to imply any limitation.

Depicted in FIG. 1 is a common short-circuit failure that occurs in prior-art wet-cell batteries such as battery 102. As can be seen, debris 120, which is conductive, has accumulated to a height sufficient to make electrical contact with electrodes 112 and 116, which are of opposite polarities. Such a contact by debris 120 causes a short-circuit between electrodes 112 and 116 causing the cell or battery 102 to exhibit low or zero voltage.

Figure 2:
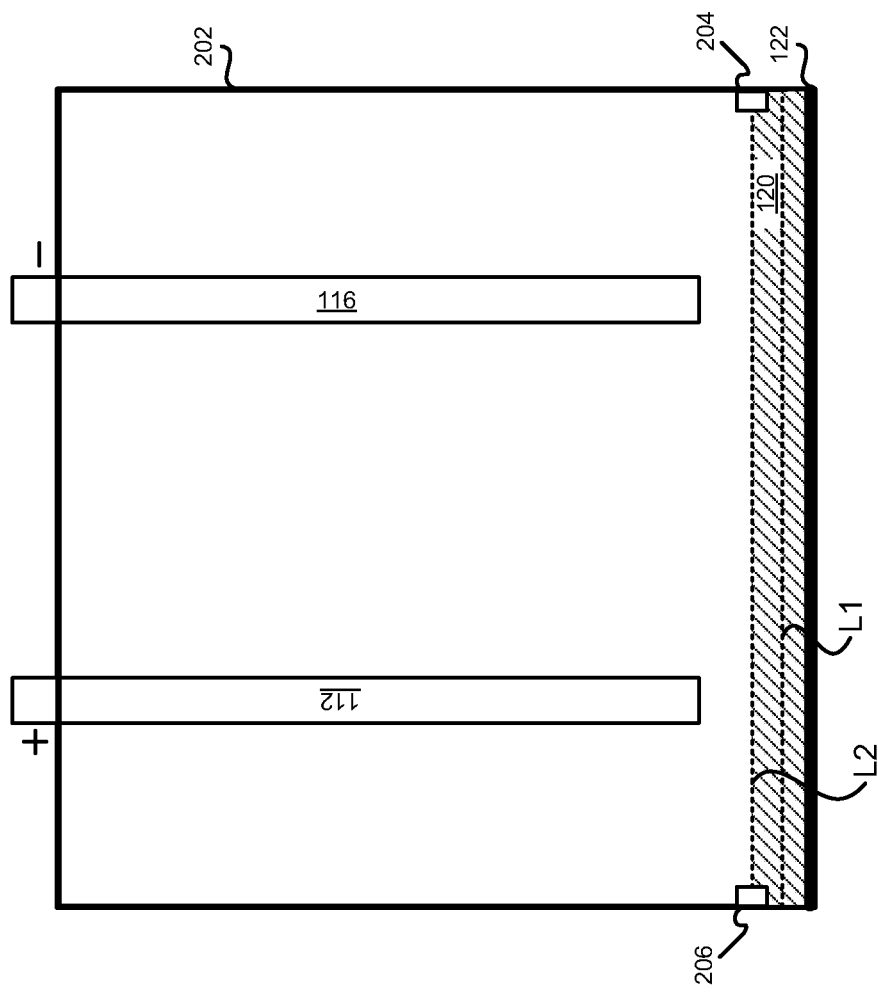
FIG. 2 depicts a block diagram of an example configuration for advance indication of short-circuit conditions in a wet-cell battery in accordance with an illustrative embodiment.

With reference to FIG. 2, this figure depicts a block diagram of an example configuration for advance indication of short-circuit conditions in a wet-cell battery in accordance with an illustrative embodiment. Battery 202 is a modified wet-cell battery, which operates on similar principles as those of battery 102 in FIG. 1, and is usable for similar purposes as battery 102 of FIG. 1. Electrodes 112 and 116 are the same as in FIG. 1.

Debris 120 of FIG. 1 collects on the inside surface of bottom 122 in a manner described with respect to FIG. 1. Suppose that the accumulation is expected to reach level L1 at one time and level L2 at another time in side battery 202. Only for the purposes of an example description, further suppose that an indication is not desired at L1 but is desired at L2. Accordingly, i-electrodes 204 and 206 are configured at heights substantially equal to L2 from the inside surface of bottom 122. I-electrode 204 is of one polarity and i-electrode 206 is of the opposite polarity. When debris 120 reaches level L2, debris 120 forms an electrically conductive path between i-electrodes 204 and 206, closing an electric circuit that uses i-electrodes 204 and 206.

An i-electrode can be fabricated in any shape or size suitable for a given implementation. For example, in one embodiment, an i-electrode, e.g., i-electrode 204, can be an entire surface, such as the surface on which i-electrode 204 is depicted. In another example embodiment, an i-electrode, e.g., i-electrode 204, can be a suitably shaped structure, such as a point-like contact area, a rectangular tape-like contact surface, a projection, or a grid on a surface. Furthermore, such a shape can span one or more surfaces. For example, a grid can be formed on bottom 122, the grid serving as i-electrode 204. Generally, one or more i-electrodes of any polarity can be shaped and positioned in this manner.

Figure 3:
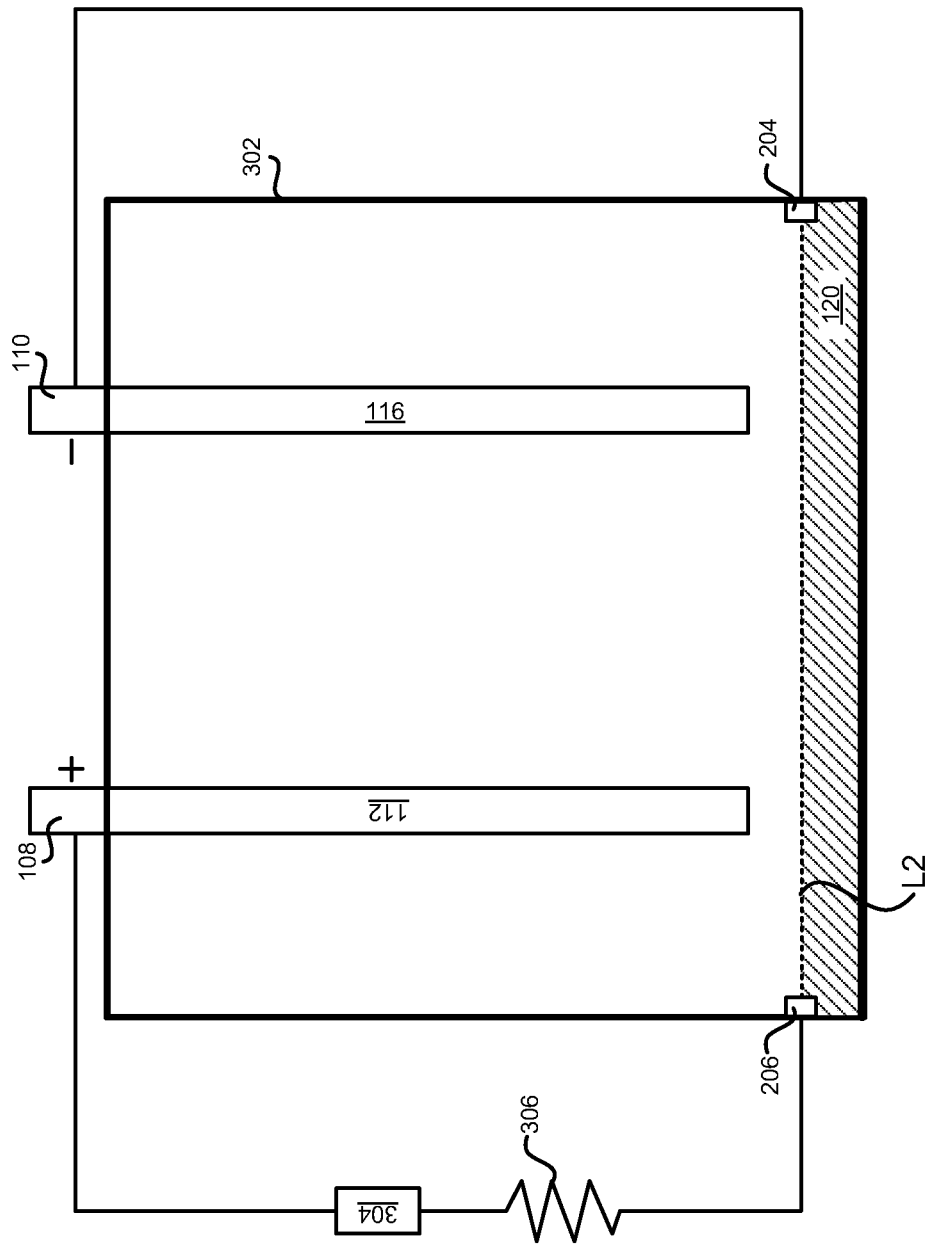
FIG. 3 depicts a block diagram of an example alternate configuration for advance indication of short-circuit conditions in a wet-cell battery in accordance with an illustrative embodiment.

With reference to FIG. 3, this figure depicts a block diagram of an example alternate configuration for advance indication of short-circuit conditions in a wet-cell battery in accordance with an illustrative embodiment. Battery 302 is operationally similar to battery 202 in FIG. 2.

As a non-limiting example, i-electrode 204 is now shown coupled to terminal 110 to achieve a negative polarity. I-electrode 206 is shown coupled to terminal 108 to achieve a positive polarity. The circuit formed between terminals 108 and 110 and i-electrodes 204 and 206 includes indicating device 304 of any suitable type, as described herein. The circuit further includes impedance device 306, which as a non-limiting example is shown as a resistor. This circuit operates to indicate debris 120 reaching level L2 in a manner described herein.

Figure 4:
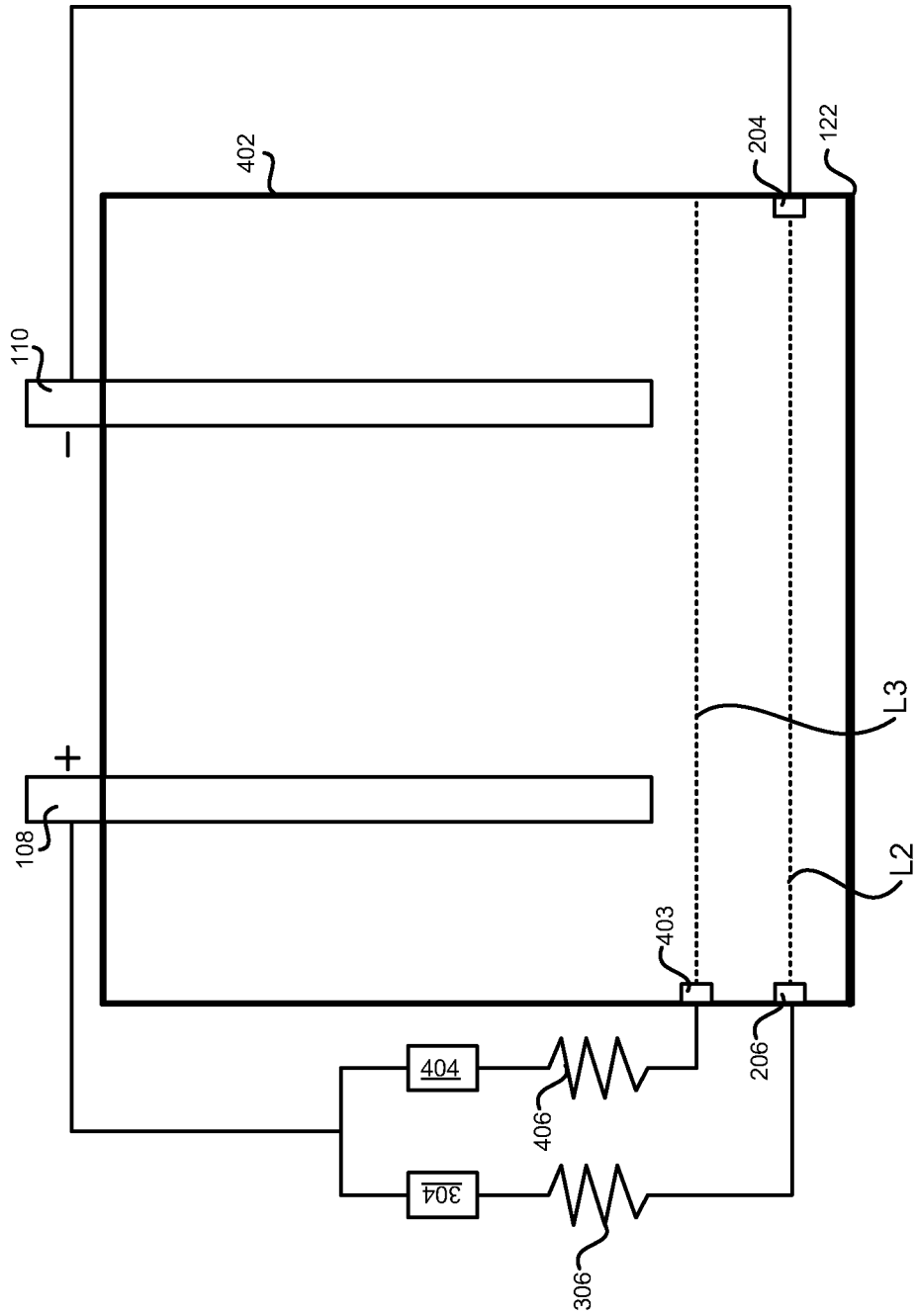
FIG. 4 depicts a block diagram of another example alternate configuration for advance indication of short-circuit conditions in a wet-cell battery in accordance with an illustrative embodiment.

With reference to FIG. 4, this figure depicts a block diagram of another example alternate configuration for advance indication of short-circuit conditions in a wet-cell battery in accordance with an illustrative embodiment. Battery 402 is operationally similar to battery 302 in FIG. 3. I-electrode 204 is coupled to terminal 110 to achieve a negative polarity and i-electrode 206 is coupled to terminal 108 to achieve a positive polarity, as in FIG. 3.

Suppose that indications are desired when the debris reaches not only level L2, as in FIG. 3, but also at level L3 as shown in this figure. Accordingly, i-electrode 403 is configured at a height substantially equal to height L3 above the inside surface of bottom 122. Only as a non-limiting example, i-electrode 403 is assigned a positive polarity. An implementation can just as well couple i-electrode 403 to terminal 110 to assign a negative polarity without departing the scope of the illustrative embodiments.

An additional i-electrode (not shown) of the opposite polarity can be configured corresponding to i-electrode 403 at height substantially equal to L3, but is not necessary. An electrical circuit is closed between i-electrodes 204 and 403 when the debris reaches L3.

Indicating device 304 and impedance device 306 are coupled and operate in the manner described with respect to FIG. 3. Indicating device 404 and impedance device 406 are coupled with i-electrode 403 to provide a similar functionality. One or more characteristics of indicating device 404 can be similar to or different from indicating device 304. For example, both indicating devices 304 and 404 can be LEDs of the same or different colors; or device 304 can be a light indicator and device 404 can be an audio indicator, etc. Impedance 406 and 306 can similarly have one or more similar or different characteristics relative to one another. For example, a higher resistance may be used with an LED-type indication device whereas a smaller resistance that may be needed with an audio indication device.

The circuit formed between terminals 108 and 110 and i-electrodes 204 and 206 operates to indicate that the debris has reached level L2. The circuit formed between terminals 108 and 110 and i-electrodes 204 and 403 operates to indicate that the debris has reached level L3.

Figure 5:
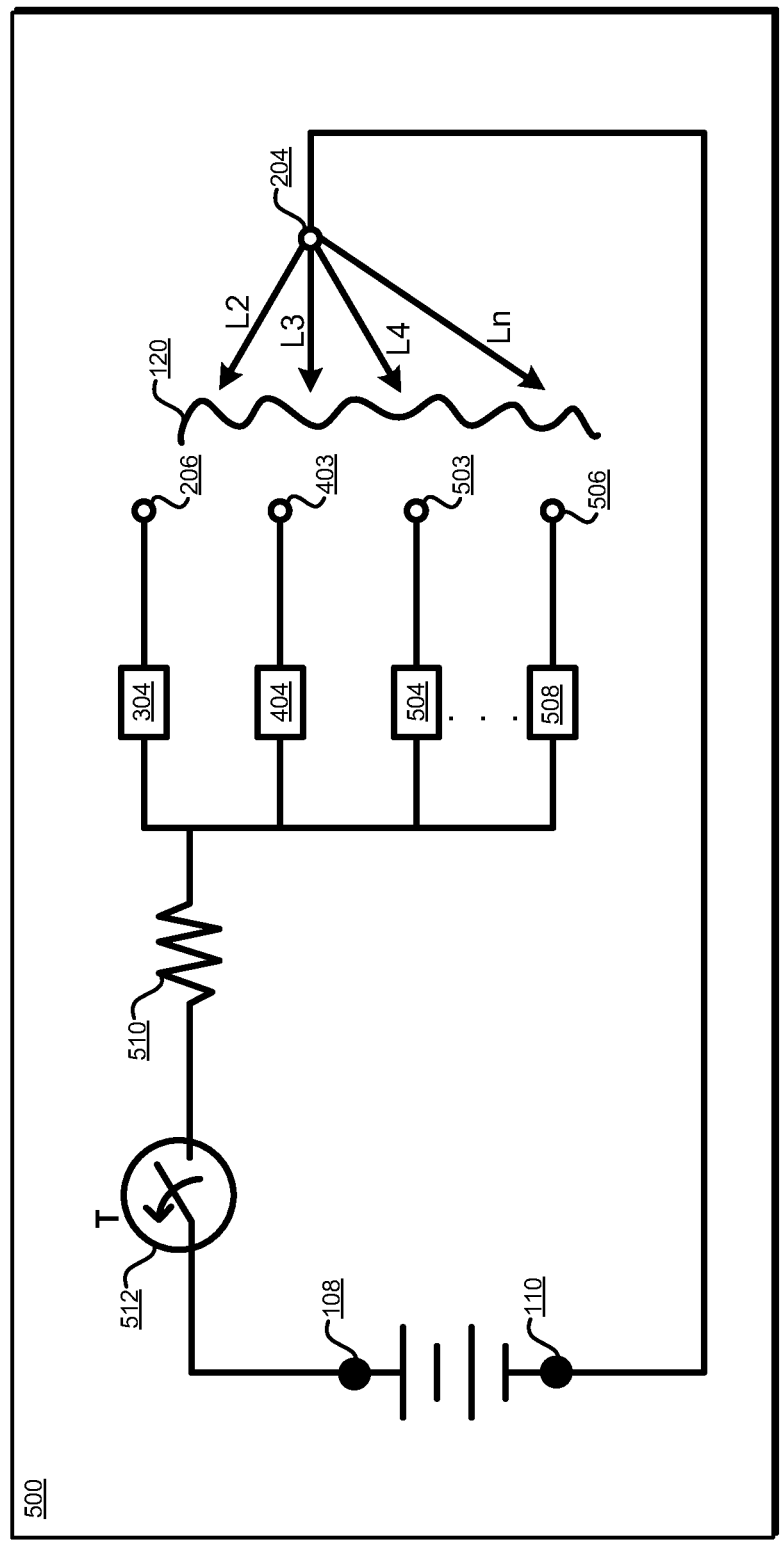
FIG. 5 depicts a diagram of an example circuit for advanced indication of short-circuit conditions in a wet-cell battery in accordance with an illustrative embodiment.

With reference to FIG. 5, this figure depicts a diagram of an example circuit for advanced indication of short-circuit conditions in a wet-cell battery in accordance with an illustrative embodiment. Circuit 500 can be implemented using battery 402 in FIG. 4.

Indications can be configured for any number of levels of accumulation of the debris inside a wet-cell. Terminals 108 and 110, i-electrodes 204, 206, and 403 are configured in circuit 500 in the manner of FIG. 4. When debris 120 reaches level L2, the electrical path between i-electrode 204 and 206 closes or becomes conductive, activating indication device 304 as described herein. When debris 120 reaches level L3, the electrical path between i-electrode 204 and 403 closes or becomes conductive, activating indication device 404 as described herein.

Additional i-electrodes are configured to indicate levels L4 . . . Ln in a similar manner. When debris 120 reaches level L4, the electrical path between i-electrode 204 and 503 closes or becomes conductive, activating indication device 504 as described herein. When debris 120 reaches level Ln, the electrical path between i-electrode 204 and 506 closes or becomes conductive, activating indication device 508 as described herein.

Impedance 510 can be common to all indication devices, as shown, or different impedance devices can be coupled with different indication devices, as described with respect to FIGS. 3 and 4. Example disconnecting device 512 is configured to open circuit 500, to wit, disrupt the flow of current in circuit 500, after the passage of time T.

Figure 6:
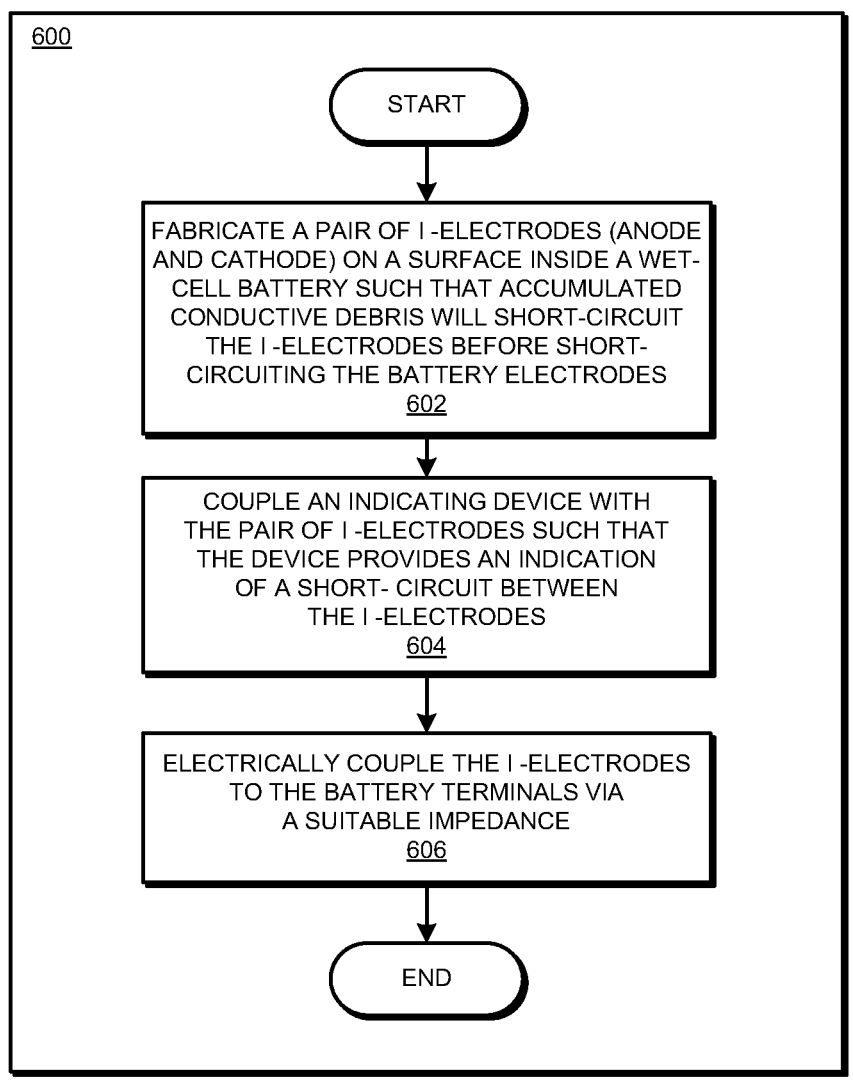
FIG. 6 depicts a flowchart of an example process for fabricating a wet-cell that can provide indication of conductive debris reaching a certain level within the wet-cell in accordance with an illustrative embodiment.

With reference to FIG. 6, this figure depicts a flowchart of an example process for fabricating a wet-cell that can provide indication of conductive debris reaching a certain level within the wet-cell in accordance with an illustrative embodiment. Process 600 can be implemented in a fabrication system to fabricate battery 402 in FIG. 4.

The fabrication system fabricates a pair of i-electrodes on a surface inside a wet-cell such that accumulated conductive debris will short-circuit the i-electrodes before short-circuiting the battery electrodes that are coupled to the battery terminal (block 602). The fabrication system electrically couples an indicating device with the pair of i-electrodes such that the indicating device provides an indication of a short-circuit between the i-electrodes (block 604). The fabrication system electrically couples the i-electrodes to the battery terminals or the battery electrodes, depending on the implementation, via a suitable impedance device (block 606). The fabrication system ends process 600 thereafter.

Thus, a modified battery apparatus, and computer implemented method for fabricating the apparatus are provided in the illustrative embodiments. Where an embodiment or a portion thereof is described with respect to a particular type of apparatus or structure, the apparatus or structure are adaptable to specific implementations using different manifestation of that type.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The process of the present invention may be implemented in a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus comprising:
   a wet-cell in a battery, the wet-cell comprising a set of i-electrodes;
   a collection surface inside the wet-cell, wherein electrically conductive debris accumulates on the surface to an expected height;
   a first i-electrode of a first polarity in the set of i-electrodes located at substantially the expected height inside the wet-cell;
   a second i-electrode of a second polarity in the set of i-electrodes located at substantially the expected height inside the wet-cell; and
   a first indication device, wherein the electrically conductive debris, when accumulated up to the expected height, cause the first indication device to produce a first indication by making simultaneous electrical contact with the first i-electrode and the second i-electrode.

2. The apparatus of claim 1, further comprising:
   a third i-electrode of the first polarity in the set of i-electrodes located at substantially a second expected height inside the wet-cell, wherein electrically conductive debris accumulates on the collection surface to the second expected height, wherein the electrically conductive debris causes a second indication when the electrically conductive debris has accumulated up to the second expected height by making simultaneous electrical contact with the third i-electrode and the second i-electrode.

3. The apparatus of claim 1, further comprising:
   a first impedance device, wherein the first impedance device is electrically coupled with a first indication device for the first indication and a second indication device for the second indication.

4. The apparatus of claim 1, further comprising:
   a first impedance device, wherein the first impedance device is configured according to an electrical property of a first indication device of the first indication.

5. The apparatus of claim 1, further comprising:
   a first surface that is perpendicular to collection surface in a direction of the expected height from the collection surface, wherein the first i-electrode is located on the first surface.

6. The apparatus of claim 1, further comprising:
   a second surface that is perpendicular to collection surface in a direction of the expected height from the collection surface, wherein the second i-electrode is located on the second surface.

7. The apparatus of claim 6, wherein the first surface and the second surface are each a part of a common surface, and wherein the first i-electrode is laterally separated from the second i-electrode by a distance on the common surface.

8. The apparatus of claim 6, wherein the first surface and the second surface are located at opposite edges of the collection surface and wherein the first surface and the second surface do not share a common edge.

9. The apparatus of claim 6, wherein the first surface and the second surface are located at adjacent edges of the collection surface and wherein the first surface and the second surface share a common edge between the first surface and the second surface.

10. The apparatus of claim 1, wherein the first i-electrode obtains a positive polarity from a positively charged electrode in the battery, and wherein the second i-electrode obtains a negative polarity from a negatively charged electrode in the battery.

11. The apparatus of claim 1, wherein the first i-electrode obtains a negative polarity from a negatively charged electrode in the battery, and wherein the second i-electrode obtains a positive polarity from a positively charged electrode in the battery.

12. The apparatus of claim 1, further comprising:
    a disconnecting device, wherein the disconnecting device automatically deactivates the first indication after a period.

13. The apparatus of claim 1, wherein a first indication device is a light emitting device, which presents the first indication as a light signal.

14. The apparatus of claim 1, wherein the first indication is a first type of indication when the debris reaches the expected height as compared to a second indication of a second type of indication when the debris reaches a second expected height.

15. A method comprising:
    constructing a wet-cell in a battery, the wet-cell comprising a set of i-electrodes;
    identifying a collection surface inside the wet-cell, wherein electrically conductive debris accumulates on the surface to an expected height;
    configuring, by causing a processor and a memory to manipulate a fabrication machine, a first i-electrode of a first polarity in the set of i-electrodes, the first i-electrode being located at substantially the expected height inside the wet-cell;
    configuring a second i-electrode of a second polarity in the set of i-electrodes, the second i-electrode being located at substantially the expected height inside the wet-cell; and
    causing, by the electrically conductive debris, a first indication device to produce a first indication, when the electrically conductive debris has accumulated up to the expected height and makes simultaneous electrical contact with the first i-electrode and the second i-electrode.

16. The method of claim 15, further comprising:
    configuring a third i-electrode of the first polarity in the set of i-electrodes located at substantially a second expected height inside the wet-cell, wherein electrically conductive debris accumulates on the collection surface to the second expected height; and
    causing, by the electrically conductive debris, a second indication, when the electrically conductive debris has accumulated up to the second expected height and makes simultaneous electrical contact with the third i-electrode and the second i-electrode.

17. The method of claim 15, further comprising:
    configuring a first impedance device, wherein the first impedance device is electrically coupled with a first indication device of the first indication and a second indication device of the second indication.

18. A computer usable program product comprising one or more computer-readable storage devices, and program instructions stored on at least one of the one or more storage devices, the stored program instructions comprising:
    program instructions to construct a wet-cell in a battery, the wet-cell comprising a set of i-electrodes;
    program instructions to identify a collection surface inside the wet-cell, wherein electrically conductive debris accumulates on the surface to an expected height;

program instructions to configure, by causing a processor and a memory to manipulate a fabrication machine, a first i-electrode of a first polarity in the set of i-electrodes, the first i-electrode being located at substantially the expected height inside the wet-cell;

program instructions to configure a second i-electrode of a second polarity in the set of i-electrodes, the second i-electrode being located at substantially the expected height inside the wet-cell; and program instructions to cause, by the electrically conductive debris, a first indication device to produce a first indication, when the electrically conductive debris has accumulated up to the expected height and makes simultaneous electrical contact with the first i-electrode and the second i-electrode.

19. The computer usable program product of claim 18, wherein the program instructions are stored in a computer readable storage device in a data processing system, and wherein the program instructions are transferred over a network from a remote data processing system.

20. The computer usable program product of claim 18, wherein the program instructions are stored in a computer readable storage device in a server data processing system, and wherein the program instructions are downloaded over a network to a remote data processing system for use in a computer readable storage device associated with the remote data processing system.

\* \* \* \* \*